Patented Oct. 17, 1922.

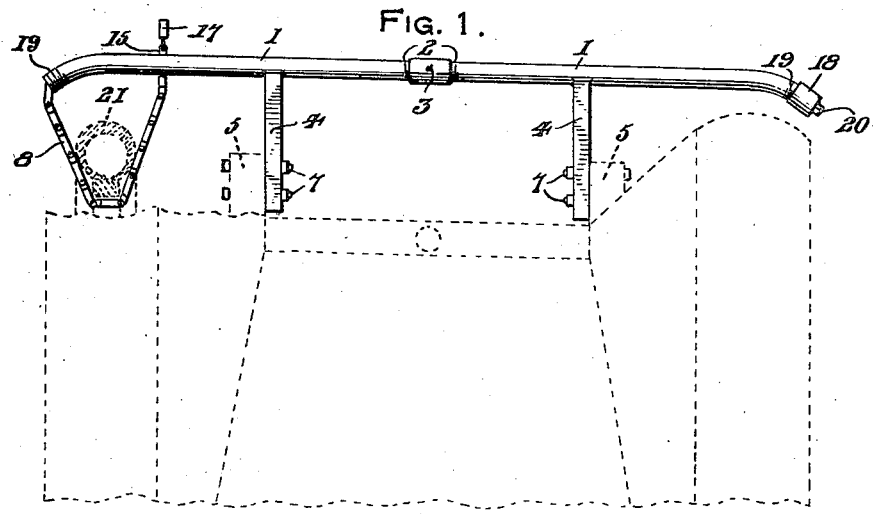

1,432,656

UNITED STATES PATENT OFFICE.

LOUIS BEDNAR, OF WESTVILLE, ILLINOIS.

COMBINED AUTOMOBILE BUMPER AND WHEEL LOCK.

Application filed September 22, 1921. Serial No. 502,448.

*To all whom it may concern:*

Be it known that I, LOUIS BEDNAR, a citizen of the United States of America, residing at Westville, in the county of Vermilion and State of Illinois, have invented certain new and useful Improvements in Combined Automobile Bumpers and Wheel Locks, of which the following is a specification.

This invention relates to certain new and useful improvements in combined automobile bumpers and wheel locks and has particular reference to a locking device carried by a bumper adapted for engagement with an automobile for preventing movement thereof.

The primary object of the invention resides in the provision of a bumper for automobiles of tubular or hollow construction having a wheel locking chain carried therein and adapted to have one end of the chain projected therefrom for encircling the rim and tire of the automobile wheel to prevent movement thereof with the free projecting end of the chain locked to the bumper.

With the above general objects in view and others that will appear as the nature of the invention is better understood, the same consists of the novel form, combination and arrangement of parts throughout the several views.

In the drawing, wherein like reference characters designate corresponding parts throughout the several views, Figure 1 is a top plan view of a combined automobile bumper and wheel lock constructed in accordance with the present invention, one of the wheel locks being projected from the bumper and enclosing a wheel rim and tire shown by dotted lines, Figure 2 is a fragmentary sectional view of the bumper and wheel lock, Figure 3 is a detail sectional view showing the end of the wheel lock chain passing through the bumper and locked thereto, and Figure 4 is a fragmentary plan view of the inner end of the wheel lock chain removed from the bumper.

Referring more in detail to the accompanying drawing there is illustrated a combined automobile bumper and wheel lock wherein the bumper is formed of tubular sections 1 threaded at their adjacent ends as at 2 for receiving a coupling sleeve 3, each section of the bumper carrying a mounting bracket 4 attached to the bar 5 of the automobile illustrated by dotted lines in Fig. 1, the mounting brackets having openings 6 therein to accommodate the bolt 7.

The wheel lock associated with the bumper embodies a chain formed of hingedly connected links 8, a chain being positioned in each section 1 with the inner link 9 carrying a plunger head 10 as clearly shown in Figs 2 and 4. A coil spring 11 placed in the adjacent ends of the sections 1 is anchored therein by the pin 12 passing through the coupling sleeve 3 as shown in Fig. 2 with the opposite ends of the spring engaging the adjacent plunger heads 10 upon the locking chains.

The outer ends of the bumper sections 1 are each provided with an opening having an inwardly directed annular shoulder 13 to limit the outward movement of the chain 8 by the plunger head 10 engaging the shoulder. The outer end link 14 of each locking chain carries a tongue 15 adapted to be passed through registering openings 16 in the adjacent section 1 and having an aperture in the end thereof to receive the shackle of a lock 17 as shown in Fig. 3.

When the locking chains are entirely retracted into the bumper sections 1 a screw cap 18 is mounted on the threaded end 19 of the bumper sections to retain the locking chains in the bumper sections with the plunger head 10 upon the inner end link 9 compressing the spring 11, a wrench head 20 on the screw cap facilitating removal thereof from the bumper.

When it is desired to lock the wheel 21 shown by dotted lines in Fig. 1 against movement the screw cap 18 is removed and the spring 11 will partially project the locking chain 8 whereupon the same is placed around the wheel 21 as shown in Fig. 1 with the tongue 15 passed through the registering openings 16 in the bumper section for reception of the lock 17 as shown in Figs. 1 and 3. In this position the wheel 21 is prevented from rotary movement with the automobile securely locked against unauthorized use thereof. The locking chain 8 when out of use, has the tongue 15 disengaged from the bumper section 1 and moved into the bumper section against the tension of the spring 11 and confined by the screw cap 18. It will therefore be seen that a novel form of combined bumper and wheel lock is provided wherein the wheel lock when out of use is housed within the bumper.

While there is herein shown and described the preferred embodiment of the present invention, it is nevertheless to be understood that minor changes may be made therein without departing from the spirit and scope thereof.

What is claimed as new is:—

1. A combined automobile bumper and wheel lock comprising a hollow bumper, a wheel locking chain confined therein and adapted to be projected from the end of the bumper for enclosing an automobile wheel adjacent the end of the bumper, an inwardly directed annular shoulder carried by the outer end of the bumper, and a plunger head carried by the inner end of the locking chain adapted to engage the shoulder to limit the outward movement thereof.

2. A combined automobile bumper and wheel lock comprising a hollow bumper, having a transverse opening therein adjacent the end, a wheel locking chain disposed in said bumper, cooperating means carried by the inner end of the chain and the bumper for limiting movement of the chain outwardly of the bumper, a tongue carried by the outer end of the chain adapted to be passed through the openings in the bumper when the chain encircles the wheel, and a lock associated with the free end of the tongue to hold the same in engagement with the bumper.

3. A combined automobile bumper and wheel lock comprising a hollow bumper, having a transverse opening therein adjacent the end, a wheel locking chain disposed in said bumper, an inwardly directed annular shoulder carried by the outer end of the bumper, a plunger head carried by the inner end of the locking chain adapted to engage the shoulder to limit the outward movement thereof, a tongue carried by the outer end of the chain adapted to be passed through the opening in the bumper when the chain encircles the wheel, and a lock associated with the free end of the tongue to hold the same in engagement with the bumper.

4. A combined automobile bumper and wheel lock comprising a hollow bumper, a wheel locking chain confined therein and adapted to be projected from the end of the bumper for enclosing an automobile wheel adjacent the end of the bumper, an inwardly directed annular shoulder carried by the outer end of the bumper, a plunger head carried by the inner end of the locking chain adapted to engage the shoulder to limit the outward movement thereof, the said bumper having a transverse opening therein, a tongue carried by the outer end of the chain adapted to be fastened through the opening in the bumper when the chain encircles the wheel, and a lock associated with the free end of the tongue to hold the same in engagement with the bumper.

5. A combined automobile bumper and wheel lock comprising a hollow bumper, a wheel locking chain confined therein and adapted to be projected from the end of the bumper for enclosing an automobile wheel adjacent the end of the bumper, an inwardly directed annular shoulder carried by the outer end of the bumper, a plunger head carried by the inner end of the locking chain adapted to engage the shoulder to limit the outward movement thereof, a transverse pin centrally of the bumper, and a return spring for the chain connected between said plunger head and pin.

6. A combined automobile bumper and wheel lock comprising a hollow bumper, having a transverse opening therein adjacent the end, a wheel locking chain disposed in said bumper, cooperating means carried by the inner end of the chain and the bumper for limiting movement of the chain outwardly of the bumper, a tongue carried by the outer end of the chain adapted to be passed through the openings in the bumper when the chain encircles the wheel, a lock associated with the free end of the tongue to hold the same in engagement with the bumper, a transverse pin centrally of the bumper and a return spring for the chain connected between said plunger head and pin.

7. A combined automobile bumper and wheel lock comprising a hollow bumper, a wheel locking chain confined therein and adapted to be projected from the end of the bumper for enclosing an automobile wheel adjacent the end of the bumper, an inwardly directed annular shoulder carried by the outer end of the bumper, a plunger head carried by the inner end of the locking chain adapted to engage the shoulder to limit the outward movement thereof, a transverse pin centrally of the bumper, and a return spring for the chain connected between the inner end of the chain and said pin.

In testimony whereof I affix my signature.

LOUIS BEDNAR.